United States Patent [19]

Harada

[11] Patent Number: 5,124,714

[45] Date of Patent: Jun. 23, 1992

[54] DUAL SLOT PLANAR MOBILE ANTENNA FED WITH COAXIAL CABLES

[75] Inventor: Takuji Harada, Kanagawa, Japan

[73] Assignee: Harada Kogyo Kabushiki Kaisha, Tokyo, Japan

[21] Appl. No.: 432,033

[22] Filed: Nov. 2, 1989

[30] Foreign Application Priority Data

Dec. 23, 1988 [JP] Japan .................... 63-325504

[51] Int. Cl.$^5$ ........................................ H01Q 13/10
[52] U.S. Cl. ............................... 343/713; 343/769; 343/770
[58] Field of Search ............. 343/725, 700 MS, 769, 343/767, 770, 711–713, 905

[56] References Cited

U.S. PATENT DOCUMENTS

| | | | |
|---|---|---|---|
| 4,162,499 | 7/1979 | Jones et al. | 343/700 MS |
| 4,208,660 | 6/1980 | McOwen | 343/769 |
| 4,320,402 | 3/1982 | Bowen | 343/769 |
| 4,809,008 | 2/1989 | Gunton | 343/700 MS |

FOREIGN PATENT DOCUMENTS 2198290 6/1988 United Kingdom ........ 343/700 MS

OTHER PUBLICATIONS

Bhattacharyya et al., "A Microstrip Array of Concentric Annular Rings", IEEE Antennas and Prop. vol. AP—33, No. 6 Jun. 1985.

*Primary Examiner*—Michael C. Wimer
*Attorney, Agent, or Firm*—Koda and Androlia

[57] ABSTRACT

A plane antenna for automobiles including a peripheral conducting surface, a first inner conducting surface provided in the peripheral conducting surface with a space in between, a second inner conducting surface provided in the first inner conducting surface with a space in between. A core conductor of a first coaxial line is connected to the first inner conducting surface and an outer skin of the first coaxial line is connected to the peripheral conducting surface, and a core conductor of a second coaxial line is connected to the second inner conducting surface and an outer skin of the second coaxial line is connected to the first inner conducting surface. The second coaxial line can be divided into two sections so that these sections are inductively connected to each other by coils.

2 Claims, 3 Drawing Sheets

DUAL SLOT PLANAR MOBILE ANTENNA FED WITH COAXIAL CABLES

BACKGROUND OF THE INVENTION

1. Field of the Invention

The present invention relates to a plane antenna which is installed in a horizontal portion such as the roof, trunk lid, etc. of an automobile.

2. Prior Art

Antennas which show little projection are in demand as antennas for mobile units such as automobiles, etc. in order to eliminate wind noise and to improve the external appearance of the vehicle. From this standpoint, plane or flat plate form antennas are desirable.

One type of plane antenna is a slot antenna. This is an antenna in which a portion of the conductor is cut out in the form of a circle (generally, cut-out slots are formed at regular intervals to form such a circle).

In conventional plane antennas, the mean diameter of the central conductor, i.e., the island-form conductor in the center, reaches approximately 1 m in the case of FM reception, so that the length of the circle (i.e. the circumference) is about 1 wavelength, that is, 3.3 m when the wave received has a frequency of 90 MHz.

Accordingly, when an attempt is made to install another plane antenna whose frequency (e.g. the 900 MHz band used for automobile telephones) differs from that of the first plane antenna installed (e.g., the 90 MHz band used for FM reception), and it is attempted to accomplish this antenna installation with the loss of any performance, such installation is very difficult in areas where the amount of space available is limited, as in the roof of a vehicle, etc.

SUMMARY OF THE INVENTION

Accordingly, the object of the present invention is to provide a plane antenna which is free from performance loss in cases where signals of different frequencies are received, even when the space for antenna installation is relatively small.

In order to achieve this object of the antenna of the present invention is provided with a second closed-circle slot in the central area of a first closed-circle slot.

Furthermore the antenna is designed so that the output cable from the second closed-circle slot is interrupted when communication signals are received by the first closed-circle slot, and the central conductor surrounded by the first closed-circle slot is used as a peripheral conductor as a ground plane when communication signals are received by the second closed-circle slot.

With such a structure, since the second closed-circle slot is installed in the central area of a first closed-circle slot, the performance of the antenna can be maintained when signals of different frequencies are received, even if the amount of space available for antenna installation is relatively small.

BRIEF DESCRIPTION OF THE DRAWINGS

FIG. 1(2) is a sectional view taken along the line I—I of FIG. 1(1);

FIG. 2(2) is a sectional view taken along the line II—II of FIG. 2(1); and

DETAILED DESCRIPTION OF THE INVENTION

Figure 1:
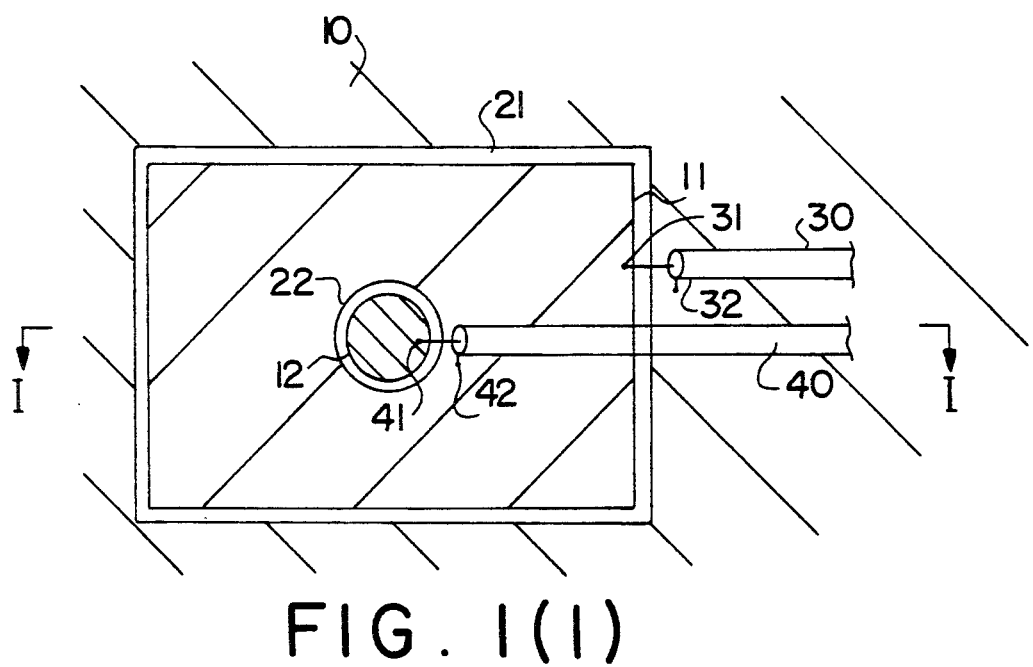
FIG. 1(1) is a plan view of a first embodiment of the antenna of the present invention.
Figure 1:
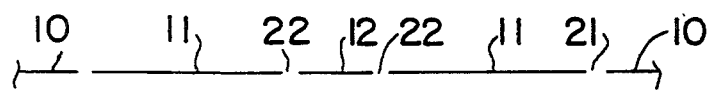

FIG. 1(1) illustrates one embodiment of the present invention and FIG. 1(2) is a schematic vertical section viewed along the line I—I in FIG. 1(1), coaxial cables being omitted from FIG. 1(2).

A first closed-circle slot 21 is provided between a peripheral conductor or peripheral conducting surface 10 and a first central conductor or first central conducting surface 11, and a second closed-circle slot 22 is provided between the first central conductor 11 and a second central conductor or second central conducting surface 12.

The core conductor 31 of a coaxial cable 30 is connected to an edge of the first central conductor 11, and the outer skin 32 of the coaxial cable 30 is connected to an edge of the peripheral conductor 10. Meanwhile, a core conductor 41 of a coaxial cable 40 is connected to an edge of the second central conductor 12, and the outer skin 42 of the coaxial cable 40 is connected to a portion that is close to the second closed-circle slot 22 of the first central conductor 11.

The coaxial cable 30 is a cable which extracts signals in the FM frequency band and AM frequency band, while the coaxial cable 40 is a cable which extracts signals in the automobile telephone band (900 MHz). Furthermore, the size of the first closed circle slot 21 is approximately 1 m×0.7 m.

The frequency band of the signals extracted by the coaxial cable 30 is lower than the frequency band of the signals extracted by the coaxial cable 40; however, it would also be possible to arrange the antenna so that signals of frequencies other than those indicated in the above mentioned example are extracted.

Furthermore, in the embodiment, the output cable 40 from the second closed-circle slot 22 is interrupted when communications are received by the first closed-circle slot 21, and the central conductor 11 surrounded by the first closed-circle slot 21 is used as a peripheral conductor (as a ground plane) when communications are received by the second closed-circle slot 22.

The coaxial cable 30 extracts signals in the FM frequency band and signals in the AM frequency band. Since signals in the FM frequency band have a high frequency, almost all of the current flows through the edge portions of the first central conductor 11; i.e., there is almost no flow of FM frequency band signals through the central portion of the first central conductor 11. Thus, since the central portion of the first central conductor 11 has no effect on the FM frequency band, signals in a higher frequency band can be extracted by the coaxial cable 40. In other words, the slot antenna utilizes the concentrated current flowing along the conductor gap; thus, the central portion of the central conductor 11 has no great effect. Accordingly, this central portion can be utilized as a around part for a second antenna. As a result of this feature, the plane antenna can be installed in a small area and used as a multi-band antenna.

Furthermore, the coaxial cable 30 also extracts signals in the AM frequency band. In the case of such signals in the AM frequency band, current flowing through the entire area of the first central conductor 11 is extracted. However, since the area of the second central conductor 11 is small compared to the area of the first central conductor 11, there are no practical problems in terms of signal reduction even if such a second central conductor 12 is installed in a portion of the first central conductor 11.

Figure 2:
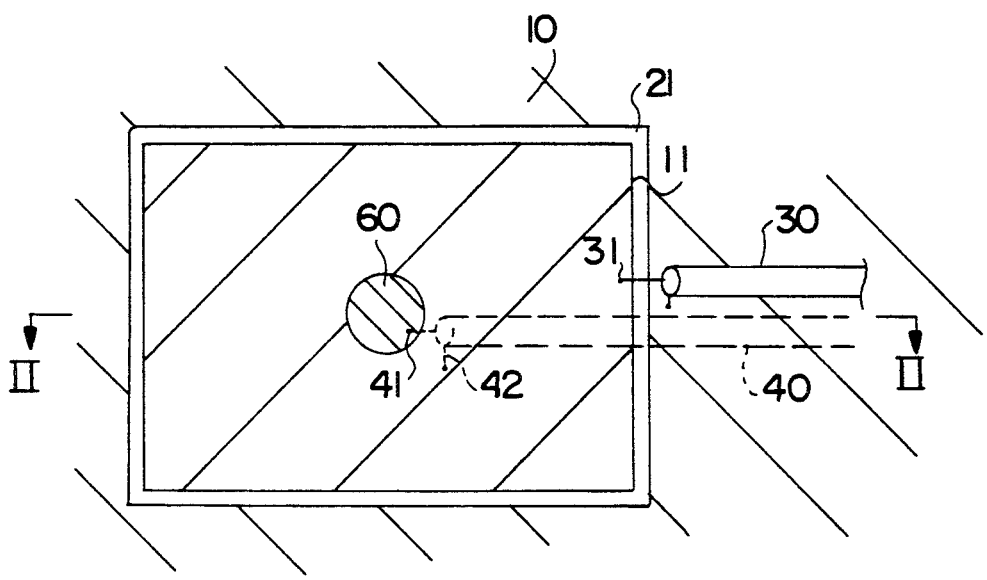
FIG. 2(1) is a plan view of a second embodiment of the present invention.
Figure 2:
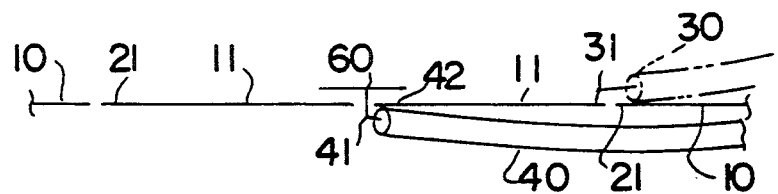

FIGS. 2(1) and 2(2) show another embodiment of the present invention. FIG. 2(1) is a plan view, and FIG. 2(2) is a longitudinal section viewed from the line II—II in FIG. 2(1).

The embodiment of FIG. 2 differs as follows from the embodiment of FIG. 1 in that a first antenna is constructed from a peripheral conductor 10, a first central conductor 11 and a first closed-circle slot 21 as in the embodiment of FIG. 1, but a strip-form flat-plate antenna is used instead of the second antenna consisting of the second central conductor 12, second closed-circle slot 22 and first central conductor 11.

The central conductor 11 surrounded by the first closed-circle slot 21 acts as a ground plate for the strip-form flat-plate antenna. In other words, the strip-form flat-plate antenna is constructed from the first central conductor 11 and a flat plate 60 which is provided above the central conductor 11. In actuality, the first central conductor 11 and conductive flat plate 60 are constructed from printed circuit boards and consist of copper foil.

Specifically, the embodiment of FIG. 2 is a plane antenna which is equipped with (a) a slot antenna which receives communications by means of a closed-circle slot, and (b) a strip-form flat-plate antenna which uses the central conductor surrounded by the closed-circle slot as a ground plate. The output cable from the strip-form flat-plate antenna is interrupted when communications are received by the slot antenna, and the central conductor surrounded by the closed-circle slot is used as a ground plate when communications are received by the strip-form flat-plate antenna.

Figure 3:
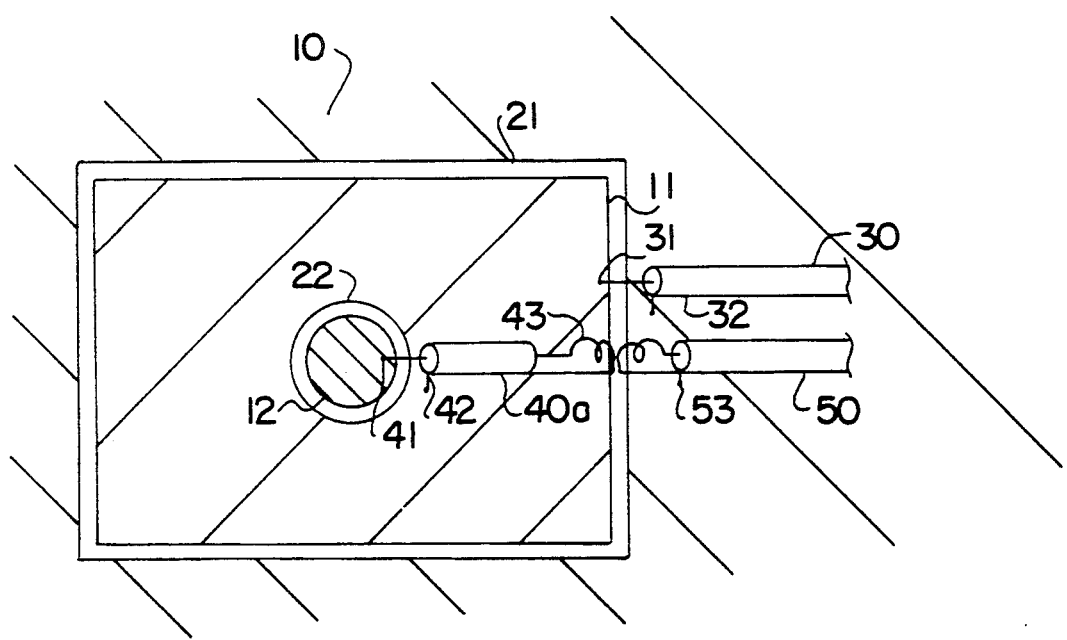
FIG. 3 is a plan view which illustrates still another embodiment of the present invention.

FIG. 3 is a plan view of another embodiment of the present invention.

This embodiment differs from the embodiment illustrated in FIG. 1 in that the coaxial cable 40 of FIG. 1 is divided into two cables, i.e., a coaxial cable 40a and a coaxial cable 50. The coaxial cable 40a and coaxial cable 50 are inductively coupled by coils 43 and 53.

When the coaxial cables are inductively coupled by coils 43 and 53, the loss of AM frequency band signals extracted via the coaxial cable 30 is reduced. Specifically, AM frequency band signals use a capacitive antenna, and are generated by capacitive components from the ground. Accordingly, if reactive capacitive components are present, the voltage is divided by the reactive capacitive components so that the reactive capacitive components generate a loss. As a result, AM frequency components extracted via the coaxial cable 30 are reduced.

Specifically, in the embodiment of FIG. 1, a large reactive capacitance is generated between the outer skin of the coaxial cable 40 and the peripheral conductor 10 when the two parts face each other over a long distance. The AM frequency band signal components extracted via the coaxial cable 30 are greatly reduced by this reactive capacitance.

If, however, the coaxial cable is divided into two coaxial cables 40a and 50, and these cables 40a and 50 are inductively coupled by coils 43 and 53 as shown in FIG. 3, the capacitance between the outer skin of the coaxial cable 50 and the peripheral conductor 10 will be interrupted even if a large capacitance should be generated between such parts. In this case, the capacitance acting as reactive capacitance from the standpoint of the AM signals extracted via the coaxial cable 30 will be only the capacitance generated between the outer cover of the coaxial cable 40a and the first peripheral conductor 10. Since the length of the coaxial cable 40a is only a few tens of cm at most, this length is extremely short from the standpoint of the wavelengths used in the AM frequency band. Accordingly, for all practical purposes, the loss in the AM frequency band can be ignored.

Furthermore, it is desirable that the gap between the facing coils 43 and 53 be positioned directly above the first closed-circle slot; and in such a case, the loss is minimal.

In addition, it would also be possible to apply this method, i.e., to divide the coaxial cable extracting signals from the second central conductor 12 and form an inductive coupling by installing facing coils in the resulting gap as shown in FIG. 3 to the embodiment of FIG. 2.

Furthermore, in the above described embodiments, the first closed-circle clot 21 has corner parts; however, the efficiency may be improved by constructing the first closed-circle slot with curved parts instead of the aforementioned sharp corner parts.

As described in detail above, according to the present invention any loss of performance in cases where signals of different frequencies are received is prevented even when the space for antenna installation is relatively small.

I claim:

1. A plane antenna for automobiles comprising:
a peripheral conducting surface;
a first inner conducting surface provided coplanar with and within said peripheral conducting surface with a space in between;
a second inner conducting surface provided coplanar with and within said first inner conducting surface with a space in between;
a first coaxial line, a core conductor of said first coaxial line being connected to said first inner conducting surface and an outer skin of said first coaxial line being connected to said peripheral outer conducting surface; and
a second coaxial line, a core conductor of said second coaxial line being connected to said second inner conducting surface and an outer skin of said second coaxial line being connected to said first inner conducting surface.

2. A plane antenna for automobiles comprising:
a peripheral conducting surface;
a first inner conducting surface provided within said peripheral conducting surface with a space in between;
a second inner conducting surface provided within said first inner conducting surface with a space in between;
a first coaxial line, a core conductor of said first coaxial line being connected to said first inner conducting surface and an outer skin of said first coaxial line being connected to said peripheral conducting surface; and
a second coaxial line, a core conductor of said second coaxial line being connected to said second inner conducting surface and an outer skin of said second coaxial line being connected to said first inner conducting surface, said second coaxial line further being divided into two sections which are inductively connected to each other with coils.

* * * * *